US009674443B2

(12) United States Patent
Kaneko et al.

(10) Patent No.: US 9,674,443 B2
(45) Date of Patent: Jun. 6, 2017

(54) IMAGING MODULE, ELECTRONIC DEVICE, AND IMAGING-MODULE MANUFACTURING METHOD

(71) Applicant: FUJIFILM Corporation, Tokyo (JP)

(72) Inventors: Yukihiro Kaneko, Saitama (JP); Kenji Yamakawa, Saitama (JP); Yoshiyuki Takase, Saitama (JP); Tatsuya Fujinami, Saitama (JP); Manabu Tobise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/007,351

(22) Filed: Jan. 27, 2016

(65) Prior Publication Data

US 2016/0142635 A1 May 19, 2016

Related U.S. Application Data

(63) Continuation of application No. PCT/JP2014/069502, filed on Jul. 24, 2014.

(30) Foreign Application Priority Data

Aug. 1, 2013 (JP) ................................ 2013-160626

(51) Int. Cl.
*H04N 5/232* (2006.01)
*H04N 5/225* (2006.01)
(Continued)

(52) U.S. Cl.
CPC ......... *H04N 5/23287* (2013.01); *G02B 7/021* (2013.01); *G02B 7/08* (2013.01);
(Continued)

(58) Field of Classification Search
CPC ............. H04N 5/23287; H04N 5/2254; H04N 5/2257; G02B 7/021; G02B 7/08;
(Continued)

(56) References Cited

U.S. PATENT DOCUMENTS 8,682,150 B2 * 3/2014 Hosokawa ............... G03B 3/02
348/208.11
2002/0080242 A1 6/2002 Takahashi et al.
(Continued)

FOREIGN PATENT DOCUMENTS

JP 2002-27309 A 1/2002
JP 2004-146859 A 5/2004
(Continued)

OTHER PUBLICATIONS

English Translation of International Preliminary Report on Patentability (including PCT/IB/373 and PC/ISA/237) for PCT/JP2014/069502, issued on Dec. 23, 2015.
(Continued)

*Primary Examiner* — Nhan T Tran
(74) *Attorney, Agent, or Firm* — Birch, Stewart, Kolasch & Birch, LLP (57) ABSTRACT

An imaging module, an electronic device, and an imaging-module manufacturing method capable of relatively easily adjusting a relative position between an imaging element unit and a lens unit with high accuracy are provided. An imaging module 1 includes an imaging element unit 3, a lens unit 2 which includes a lens group 10, a first image-blur correction driving unit 30x, a second image-blur correction driving unit 30y, a focus driving unit 30z, and a connection portion 41 which is electrically connected to a circuit of the imaging element unit by a conductive joining material, and a flexible wiring portion 12 which includes a wiring group which connects the circuit of the imaging element unit to at least one driving unit among the first image-blur correction driving unit, the second image-blur correction driving unit, and the focus driving unit, and extends between the imaging element unit and the lens unit.

20 Claims, 8 Drawing Sheets

(51) Int. Cl.
*G02B 7/02* (2006.01)
*G03B 5/00* (2006.01)
*G02B 7/09* (2006.01)
*G02B 27/62* (2006.01)
*G02B 27/64* (2006.01)
*G02B 7/08* (2006.01)

(52) U.S. Cl.
CPC ............... *G02B 7/09* (2013.01); *G02B 27/62* (2013.01); *G02B 27/646* (2013.01); *G03B 5/00* (2013.01); *H04N 5/2254* (2013.01); *H04N 5/2257* (2013.01); *H04N 5/23212* (2013.01); *G03B 2205/0069* (2013.01)

(58) Field of Classification Search
CPC ........ G02B 7/09; G02B 27/62; G02B 27/646; G03B 5/00
USPC ......... 348/357, 373, 374, 335, 208.7, 208.11
See application file for complete search history.

(56) References Cited

U.S. PATENT DOCUMENTS

| | | | |
|---|---|---|---|
| 2007/0183764 A1 | 8/2007 | Imura et al. | |
| 2009/0002825 A1 | 1/2009 | Morita et al. | |
| 2009/0180021 A1* | 7/2009 | Kikuchi | H04N 5/2257 348/349 |
| 2009/0201399 A1 | 8/2009 | Senga | |
| 2010/0091120 A1* | 4/2010 | Nagata | H04N 5/2254 348/208.4 |
| 2011/0103782 A1* | 5/2011 | Tsuruta | H04N 5/2254 396/55 |
| 2011/0150441 A1* | 6/2011 | Ollila | G02B 7/08 396/55 |
| 2011/0176046 A1* | 7/2011 | Hu | G02B 7/08 348/335 |
| 2011/0286732 A1 | 11/2011 | Hosokawa et al. | |
| 2012/0224840 A1* | 9/2012 | Minamisawa | G03B 5/00 396/55 |
| 2015/0229843 A1* | 8/2015 | Shimizu | G03B 5/00 348/222.1 |

FOREIGN PATENT DOCUMENTS

| | | |
|---|---|---|
| JP | 2007-199319 A | 8/2007 |
| JP | 2009-186796 A | 8/2009 |
| JP | 2010-21985 A | 1/2010 |
| JP | 2011-247909 A | 12/2011 |
| JP | 2012-37689 A | 2/2012 |
| JP | 2012-238029 A | 12/2012 |
| JP | 2013-88525 A | 5/2013 |
| WO | WO 2006/075545 A1 | 7/2006 |
| WO | WO 2011/037027 A1 | 3/2011 |

OTHER PUBLICATIONS

International Preliminary Examination Report (PCT/IPEA/409 and PCT/IPEA/416), issued in PCT/JP2014/069502, dated May 7, 2015.
International Search Report, issued in PCT/JP2014/069502, dated Oct. 28, 2014.
Written Opinion of the International Searching Authority, issued in PCT/JP2014/069502, dated Oct. 28, 2014.

* cited by examiner

IMAGING MODULE, ELECTRONIC DEVICE, AND IMAGING-MODULE MANUFACTURING METHOD

CROSS-REFERENCE TO RELATED APPLICATIONS

This application is a Continuation of PCT International Application No. PCT/JP2014/069502 filed on Jul. 24, 2014, which claims priority under 35 U.S.0 §119(a) to Japanese Patent Application No. 2013-160626 filed on Aug. 1, 2013. Each of the above application(s) is hereby expressly incorporated by reference, in its entirety, into the present application.

BACKGROUND OF THE INVENTION

1. Field of the Invention

The present invention relates to an imaging module, an electric device, and an imaging-module manufacturing method.

2. Description of the Related Art

As an imaging module which is mounted on a portable electronic device such as a portable phone, an imaging module having an autofocus function or an image-blur correction function has been known (for example, refer to JP2012-37689A and JP2013-88525A).

An imaging module disclosed in JP2012-37689A is an imaging module having an image-blur correction function, the imaging module includes a unit in which a lens group and an imaging element are integrated with each other, and a lens drive unit which oscillates the unit of the lens group and the imaging element, and an image blur is prevented by oscillating the unit of the lens group and the imaging element. The lens drive unit is connected to a terminal portion, which is provided on a flexible substrate connected to the imaging element, via the flexible substrate, and power or the like is supplied to the lens drive unit via both flexible substrates to operate the lens drive unit.

An imaging module disclosed in JP2013-88525A is an imaging module having an autofocus function and an image-blur correction function. The imaging module includes an imaging element unit having an imaging element, and a lens unit which includes a lens group and a lens drive unit which displaces the lens group, and is bonded and fixed to the imaging element unit. In addition, autofocus is adjusted by adjusting a position of the lens group using the lens drive unit, and image blur is prevented. The lens drive unit is connected to a terminal portion, which is provided on a substrate of the imaging element unit, via a flexible substrate, and power or the like is supplied to the lens drive unit via the substrate of the imaging element unit and the flexible substrate to operate the lens drive unit.

In addition, in an imaging-module manufacturing method disclosed in JP2013-88525A, in order to increase accuracy of a relative positional posture between the imaging element and the lens group, after the imaging element unit and the lens unit are bonded and fixed to each other, the flexible substrate is connected to the terminal portion provided on the substrate of the imaging element unit. Accordingly, an external force such as a reaction force with respect to bending of the flexible substrate acts on the imaging element unit and the lens unit, and a decrease in accuracy of the relative positional posture between the imaging element and the lens group is prevented.

In addition, as a method which adjusts the relative positional posture between the imaging element unit and the lens unit so as to fix both units to each other, a method is known in which an imaging element unit or a lens unit is disposed at a position different from each other in a direction of an optical axis of a lens group, an adjustment amount of the relative positional posture between both units is calculated from a plurality of images obtained by imaging a measurement chart at each position, the relative positional posture between the lens unit and the imaging element unit is adjusted according to the calculated adjustment amount, and both units are bonded and fixed to each other in a state where the relative positional posture is adjusted (refer to JP2010-21985A).

SUMMARY OF THE INVENTION

According to an increase in a pixel number of an imaging element, higher accuracy in adjustment of a relative positional posture between an imaging element unit and a lens unit is required.

In the method disclosed in JP2010-21985A, when a relative position between an imaging element unit and a lens unit is adjusted based on a plurality of images obtained by imaging a measurement chart, it is possible to increase accuracy of a relative positional posture between the imaging element unit and the lens unit which is obtained from the adjustment by disposing a lens group, which is moved so as to perform focus adjustment or an image blur correction, at a predetermined position. However, when the adjustment is performed, it is necessary to operate a lens drive unit which moves the lens group.

In the imaging-module manufacturing method disclosed in JP2013-88525A, after adjustment of a relative positional posture between an imaging element unit and a lens unit, and bonding and fixing between both units are completed, a flexible substrate connected to a lens drive unit of a lens unit is connected to a terminal portion provided on a substrate of the imaging element unit. Accordingly, when the relative positional posture between the imaging element unit and the lens unit is adjusted, it is not possible to operate the lens drive unit via a substrate of the imaging element unit and a flexible substrate.

An object of the present invention is to easily adjust a relative positional posture between an imaging element unit and a lens unit with higher accuracy unlike the related art.

(1) An imaging module includes: an imaging element unit which has a circuit in which an imaging element and an external connection portion are provided; a lens unit which has a lens group, a first image-blur correction driving unit which moves at least a portion of lenses of the lens group with respect to the imaging element in a first direction in a plane intersecting an optical axis of the lens group, a second image-blur correction driving unit which moves at least a portion of the lenses with respect to the imaging element in a second direction intersecting the first direction, and a focus driving unit which moves at least a portion of the lenses of the lens group with respect to the imaging element in a direction of the optical axis of the lens group, and which is fixed to the imaging element unit; and a flexible wiring portion which has an accommodation region accommodated in the lens unit, a lead-out region led outside the lens unit, and extends between the imaging element unit and the lens unit, in which the flexible wiring portion includes a first wiring group which is electrically connected to at least one driving unit of the first image-blur correction driving unit, the second image-blur correction driving unit, or the focus driving unit, and is led from the accommodation region to the lead-out region, and a second wiring group which is electrically connected to a driving unit except for the driving unit which is electrically connected to the first wiring group among the first image-blur correction driving unit, the second image-blur correction driving unit, and the focus driving unit, and the circuit is electrically connected to the second wiring group via a first connection portion of the flexible wiring portion in the accommodation region and is electrically connected to the first wiring group via a second connection portion of the flexible wiring portion in the lead-out region, using a conductive joining material by which the circuit and the flexible wiring portion are joined to each other.

(2) In a manufacturing method of the imaging module described in (1), the method includes: moving any one of the lens unit and the imaging element unit set on a Z axis orthogonal to a measurement chart, and the measurement chart to a plurality of measurement positions; imaging a measurement chart image, which is imaged by the lens unit, using the imaging element, in each of the measurement positions in a state where the driving unit which is connected to the circuit by the first wiring group included in the flexible wiring portion is operated through the external connection portion; calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and adjusting a relative positional posture between the lens unit and the imaging element unit based on the calculated adjustment amounts, fixing the lens unit and the imaging element unit, and connecting the first connection portion to the circuit.

(3) In a manufacturing method of the imaging module described in (1), the method includes: moving any one of the lens unit and the imaging element unit set on a Z axis orthogonal to a measurement chart, and the measurement chart to a plurality of measurement positions; imaging a measurement chart image, which is imaged by the lens unit, using the imaging element, in each of the measurement positions in a state where the driving unit to which the first wiring group included in the flexible wiring portion is connected is operated through the first wiring group; calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and adjusting a relative position posture between the lens unit and the imaging element unit based on the calculated adjustment amounts, fixing the lens unit and the imaging element unit to each other, and connecting the first connection portion to the circuit.

According to the present invention, unlike the related art, it is possible to easily adjust a relative positional posture between an imaging element unit and a lens unit with high accuracy.

DESCRIPTION OF THE PREFERRED EMBODIMENTS

Hereinafter, embodiments of the present invention will be described in detail with reference to the drawings.

<Configuration of Imaging Module>

Figure 1:
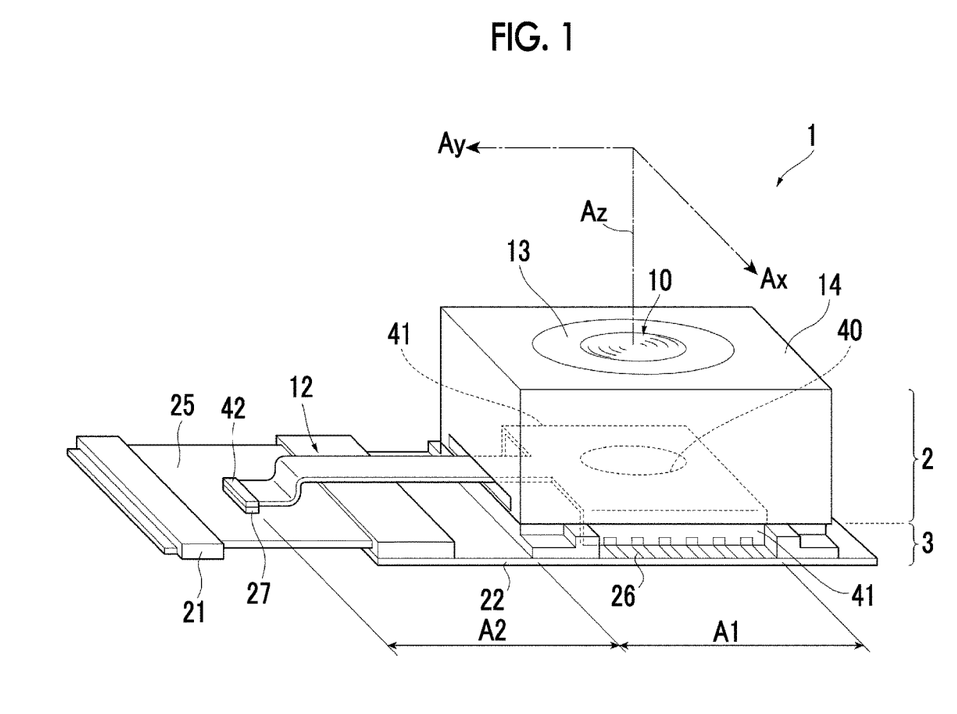
FIG. 1 is an external perspective view of an example of an imaging module for explaining an embodiment of the present invention.
Figure 2:
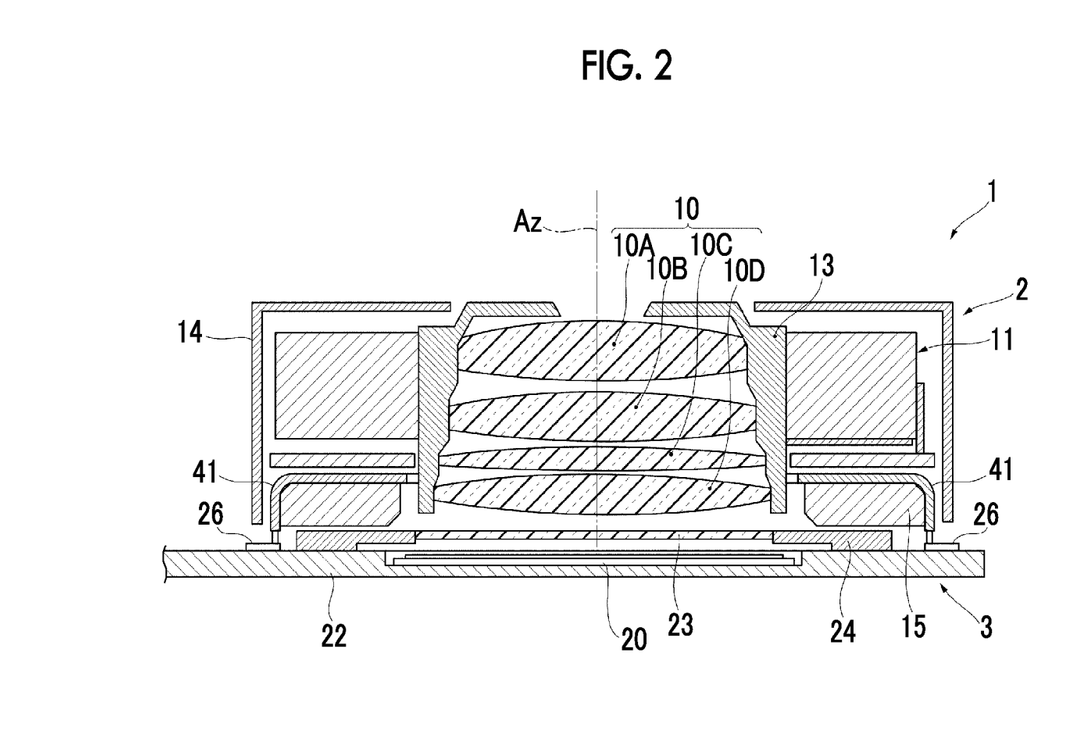
FIG. 2 is a sectional view of an imaging module of FIG. 1.

FIG. 1 shows an external appearance of an example of an imaging module for explaining an embodiment of the present invention, and FIG. 2 shows a section of the imaging module of FIG. 1.

An imaging module 1 includes a lens unit 2 and an imaging element unit 3 to which the lens unit 2 is fixed.

The lens unit 2 includes a lens group 10, a lens drive unit 11, and a flexible substrate 12.

The lens group 10 is accommodated in a tubular lens barrel 13, and is integrally supported by the lens barrel 13. In addition, in the shown example, the lens group 10 is configured of four lenses such as lenses 10A, 10B, 10C, and 10D. However, the number of lenses is not limited to four.

The lens drive unit 11 moves the lens barrel 13, which supports the lens group 10, along an optical axis Az of the lens so as to perform focus adjustment. In addition, the lens drive unit 11 moves the lens barrel 13 along an Ax axis and an Ay axis orthogonal to each other in a plane orthogonal to the optical axis Az of the lens so as to perform image blur correction. In addition, the focus adjustment or the image blur correction may be performed by moving a portion of the lenses of the lens group 10.

The lens group 10, the lens barrel 13, and the lens drive unit 11 are accommodated in a housing 14, and an opening, which is open on a bottom portion of the housing 14 between the lens barrel 13 and the housing 14, is closed by a bottom block 15.

The flexible substrate 12 is configured so as to include a plurality of wires which transmit signals (including power) for operating the lens drive unit 11, and includes an accommodation region A1 and a lead-out region (flexible wiring portion) A2.

The accommodation region A1 is accommodated in the housing 14 of the lens unit 2, is disposed so as to insert the lens barrel 13 into a circular hole 40 and to surround an outer circumference of the lens barrel 13, and is fixed to the bottom block 15. A plurality of wires included in the flexible substrate 12 are electrically connected to the lens drive unit 11, which is disposed on the outer circumference of the lens barrel 13, via connection portions at appropriate locations of the accommodation region A1.

A first connection portion 41 is provided in the accommodation region A1, and terminals of a portion of wiring groups of the plurality of wires included in the flexible substrate 12 are connected to the first connection portion 41.

The lead-out region A2 is led out from the housing 14, is disposed so as to extend between the lens unit 2 and the imaging element unit 3, and is flexibly configured. A second connection portion 42 is provided on a tip portion of the lead-out region A2, and terminals of the remaining wiring groups except for the wiring groups routed to the first connection portion 41 among the plurality of wires included in the flexible substrate 12 are provided on the second connection portion 42. The wiring groups routed to the second connection portion 42 are flexibly wired by the lead-out region A2.

The imaging element unit 3 includes an imaging element 20 and a circuit on which an external connection portion 21 is provided.

The imaging element 20 is an imaging element such as a Charge Coupled Device (CCD) image sensor or a Complementary Metal-Oxide Semiconductor(CMOS) image sensor, and for example, an imaging element having a relatively high pixel number such as three million pixels to ten million pixels.

The imaging element 20 is mounted on an element fixing substrate 22, and is covered by a cover glass 23. The cover glass 23 is supported by a cover holder 24 and is disposed on the element fixing substrate 22.

The circuit which is provided on the imaging element unit 3 is a circuit for driving the imaging element 20 or the lens drive unit 11, and is provided on the element fixing substrate 22 and a flexible substrate 25 which extends from the element fixing substrate 22. The external connection portion 21 is a connection portion for connecting the circuit of the imaging element unit 3 to a circuit of an external device, and in the shown example, is provided on the tip portion of the flexible substrate 25.

In addition, a connection portion 26 which is connected to the first connection portion 41 of the flexible substrate 12 of the lens unit 2 is provided on the element fixing substrate 22, and a connection portion 27 which is connected to the second connection portion 42 of the flexible substrate 12 is provided on the flexible substrate 25. For example, the first connection portion 41 is connected to the connection portion 26 by a conductive joining material such as solder or conductive paste.

The lens drive unit 11 of the lens unit 2 is electrically connected to the circuit of the imaging element unit 3 via the plurality of wires included in the flexible substrate 12 by connecting the first connection portion 41 and the connection portion 26 and by connecting the second connection portion 42 and the connection portion 27.

The lens unit 2 is assembled with the imaging element unit 3 in a state where an image forming surface of the lens group 10 is coincident with an image receiving surface of the imaging element 20, and the lens unit 2 is fixed in the assembled state. For example, the fixing between the lens unit 2 and the imaging element unit 3 is performed by bonding between the housing 14 or the bottom block 15 of the lens unit 2 and the element fixing substrate 22 or the cover holder 24 of the imaging element unit 3.

Figure 3:
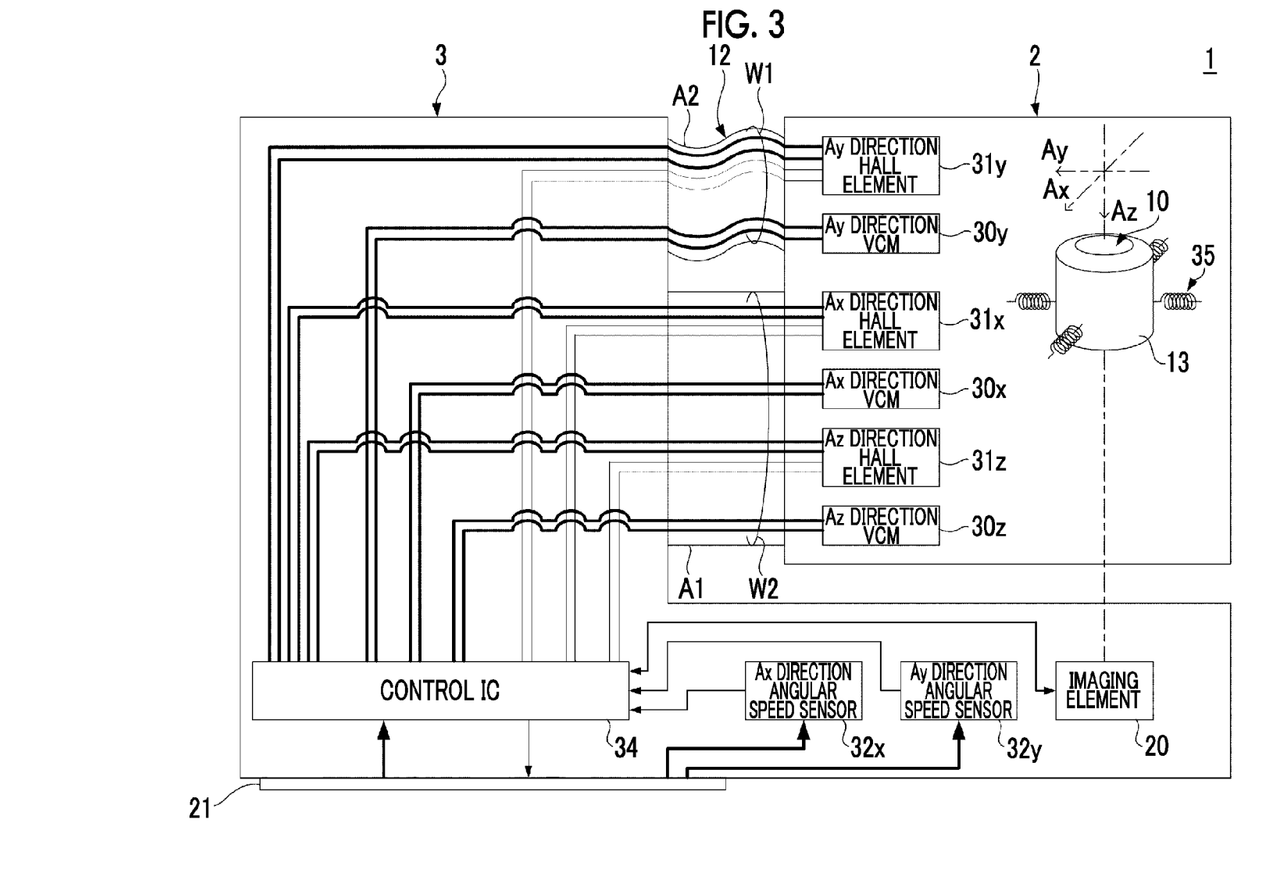
FIG. 3 is a functional block diagram of the imaging module of FIG. 1.

FIG. 3 shows a functional block of the imaging module 1.

The lens drive unit 11 of the lens unit 2 includes an Ax direction actuator (first image-blur correction driving unit) 30$x$ which moves the lens barrel 13 in an Ax axial direction (first direction) on an Ax axis and an Ay axis orthogonal to each other in a plane orthogonal to an Az axis (optical axis), an Ay direction actuator (second image-blur correction driving unit) 30$y$ which moves the lens barrel 13 in an Ay axial direction (second direction), an Az direction actuator (focus driving unit) which moves the lens barrel 13 in an Az axial direction (direction of optical axis), a position sensor 31$x$ which detects the position of the lens barrel 13 in the Ax axial direction, a position sensor 31$y$ which detects the position of the lens barrel 13 in the Ay axial direction, a position sensor 31$z$ which detects the position of the lens barrel 13 in the Az axial direction, and a biasing member 35.

The biasing member 35 holds the lens barrel 13 at a predetermined position in axial directions such as the Ax axial direction, the Ay axial direction, and the Az axial direction, and for example, a spring or the like is used for the biasing member 35. As the predetermined positions of the lens barrel 13 in the Ax axial direction and the Ay axial direction, an original position at which the optical axis Az of the lens passes through a center position of the image receiving surface of the imaging element 20 may be exemplified, and as the predetermined position of the lens barrel 13 in the Az axial direction, a position corresponding to a ∞ end or a NEAR end of a focus may be exemplified.

In the circuit of the imaging element unit 3, an angular speed sensor 32$x$ which detects an angular speed around the Ax axis acting on the imaging module 1, an angular speed sensor 32$y$ which detects an angular speed around the Ay axis acting on the imaging module 1, and a control integrated circuit (IC) 34 which drives the actuators 30$x$, 30$y$, and 30$z$ are provided.

The control IC 34 calculates a movement amount in the Az axial direction of the lens barrel 13 for performing the focus adjustment based on position signals output from the position sensor 31$z$ and image signals output from the imaging element 20, calculates movement amounts in the Ax axial direction and the Ay axial direction of the lens barrel 13 for performing the image blur correction from angular speed signals output from the angular speed sensor 32$x$ or 32$y$ and position signals output from the position sensors 31$x$ and 31$y$, and controls the actuators 30$x$, 30$y$, and 30$z$ based on the calculated movement amount in each direction.

Driving power of the angular speed sensors 32$x$ and 32$y$ and the control IC 34 is supplied from the external device which is connected to the external connection portion 21 of the imaging element unit 3, and driving power of the actuators 30$x$, 30$y$, and 30$z$ or driving power of the position sensors 31$x$, 31$y$, and 31$z$ is supplied from the control IC 34.

In the above-described configuration, a wiring group which supplies the driving power to the actuators 30$x$, 30$y$, and 30$z$, a wiring group which supplies the driving power to position sensors 31$x$, 31$y$, and 31$z$, and a wiring group for transmitting positional signals of the position sensors 31$x$, 31$y$, and 31$z$ are wired by the flexible substrate 12. In addition, the flexible substrate 12 may include other wires (for example, a ground wire) extending between the lens unit 2 and the imaging element unit 3. Moreover, in FIG. 3, wires for transmitting for the driving power are shown by thick solid lines, and wires for transmitting position signals or angular speed signals are shown by thin solid lines.

In the shown example, as the actuators 30$x$, 30$y$, and 30$z$, voice coil motors (VCM) are used, and typically, two wires are required with respect to one VCM. Moreover, in the shown example, as the position sensors 31$x$, 31$y$, and 31$z$, hall elements are used, and typically, four wires are required with respect to one hall element. Accordingly, the flexible substrate 12 includes a plurality of wires. In addition, the actuator is not limited to the VCM, and the position sensor is not limited to the hall element.

In the plurality of wires included in the flexible substrate 12, a wiring group W1 which is a portion including the wiring group connected to at least one actuator of the actuators 30$x$, 30$y$, and 30$z$ is routed to the second connection portion 42 of the lead-out region A2, and the remaining wiring group W2 is routed to the first connection portion 41 of the accommodation region A1. In the shown example, the wiring group which is electrically connected to the Ay direction actuator 30y which moves the lens barrel 13 in the Ay axial direction, and the wiring group which is electrically connected to the position sensor 31y which detects the position of the lens barrel 13 in the Ay axial direction are routed to the second connection portion 42 of the lead-out region A2.

The method of dividing the wiring groups into the wiring group W1 and the wiring group W2 is not limited to the example. The wiring group W1 may include the wiring groups which are electrically connected to two actuators of the actuators 30x, 30y, and 30z, and may further include the wiring groups which are electrically connected to the position sensors corresponding to the two actuators. In addition, the wiring group W1 may include the wiring groups which are electrically connected to all actuators of the actuators 30x, 30y, and 30z, and may further include the wiring groups which are electrically connected to all position sensors of the position sensors 31x, 31y, and 31z as long as one or more wires (for example, a ground wire) belonging to the wiring group W2 are present.

<Imaging-Module Manufacturing Method>

Figure 4:
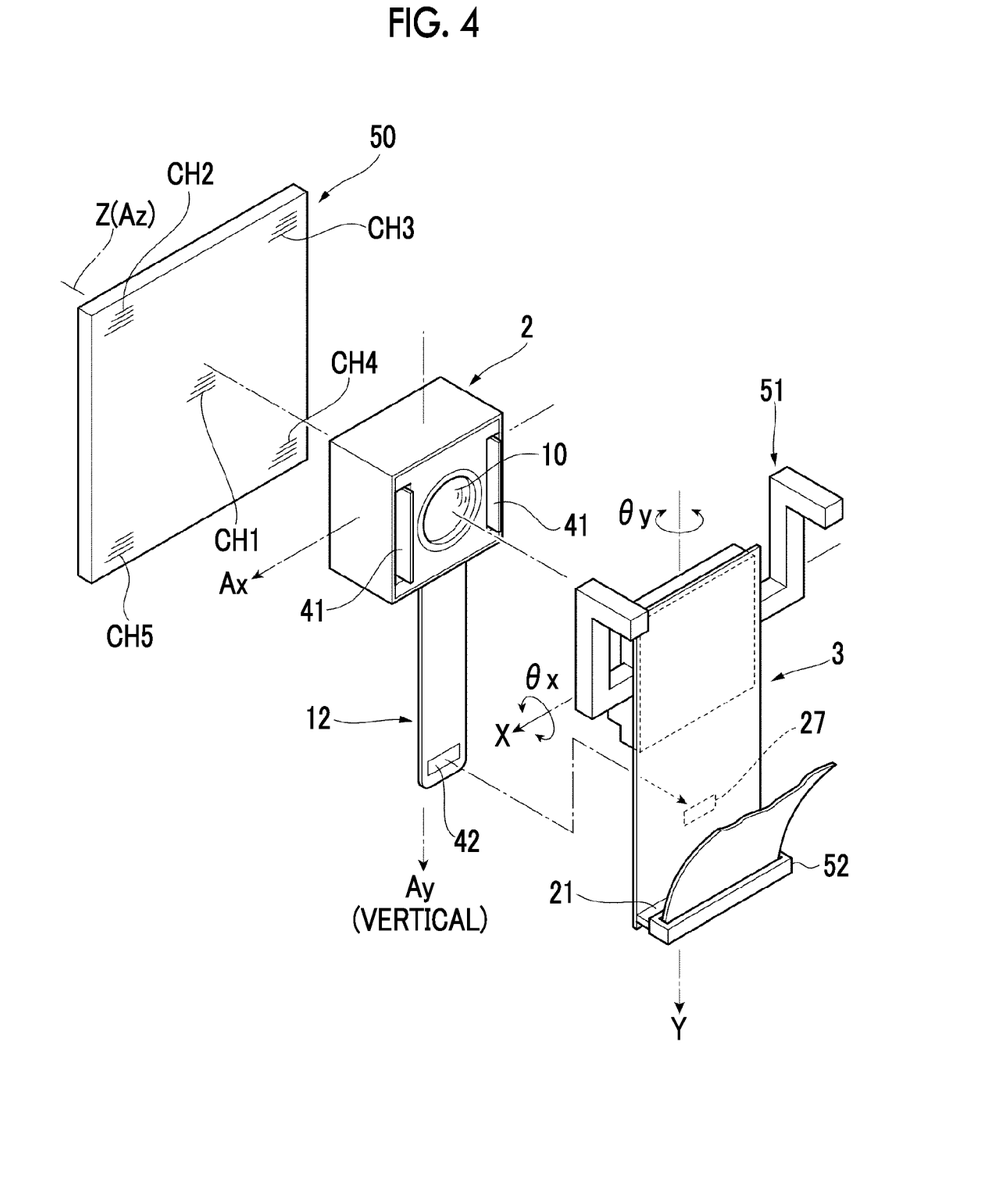
FIG. 4 is a schematic view showing an example of a manufacturing method of the imaging module of FIG. 1.

FIG. 4 schematically shows an example of a manufacturing method of the imaging module 1.

A relative positional posture between the lens unit 2 and the imaging element unit 3 is adjusted, the lens unit 2 and the imaging element unit 3 are fixed after the adjustment, and the imaging module 1 is manufactured.

In order to adjust the relative positional posture between the lens unit 2 and the imaging element unit 3, a measurement chart 50 is used. A plurality of chart images CH1, CH2, CH3, CH4, and CH5 are printed on a surface of the measurement chart 50. The chart images CH1, CH2, CH3, CH4, and CH5 are so-called rudder-shaped chart patterns in which black lines are arranged at regular intervals, and have the same images.

The lens unit 2 is set in a state where the optical axis Az of the lens is coincident with the Z axis which passes through the center of the measurement chart 50 and is orthogonal to the measurement chart 50. The imaging element unit 3 is set in a state where the center position of the image receiving surface of the imaging element 20 is positioned on the Z axis by a holding member 51.

The holding member 51 is configured so as to be movable in the Z axis direction, and is configured so as to be rotatable around the X axis and the Y axis with the center position of the image receiving surface of the imaging element 20 as a rotation center. Accordingly, a positional relationship between the center position of the image receiving surface of the imaging element 20 and the Z axis is constantly maintained regardless of the rotation of the imaging element unit 3. According to the rotations of the holding member 51 around the X axis and the Y axis and the movement of the holding member 51 in the Z axis direction, the relative positional posture between the lens unit 2 and the imaging element unit 3 is adjusted.

A connector cable 52 is connected to the external connection portion 21 of the imaging element unit 3. The connector cable 52 is configured so as to include a wiring group which transmits signals for operating the imaging element 20 of the imaging element unit 3 and transmits image signals output from the imaging element 20, and a wiring group which transmits signals for operating the Ay direction actuator 30y of the lens unit 2 to which the flexibly wired wiring group W1 is connected and the position sensor 31y.

In the above-described configuration, in order to allow the rotation and the movement of the holding member 51 for adjusting the relative positional posture between the lens unit 2 and the imaging element unit 3, when the adjustment is performed, only the second connection portion 42 which is provided in the lead-out region A2 of the flexible substrate 12, to which the wiring group W1 is flexibly wired, is connected to the connection portion 27 (refer to FIG. 1) of the imaging element unit 3. Meanwhile, after the fixing between the lens unit 2 and the imaging element unit 3 is completed, the first connection portion 41 which is provided in the accommodation region A1 of the flexible substrate 12, to which the wiring group W2 is wired, is connected to the connection portion 26 of the imaging element unit 3.

In addition, the lens unit 2, the imaging element unit 3, and the measurement chart 50 are set in a state where the Ay axial direction which is the movement direction of the lens barrel 13 operated by the Ay direction actuator 30y is vertical.

Figure 5:
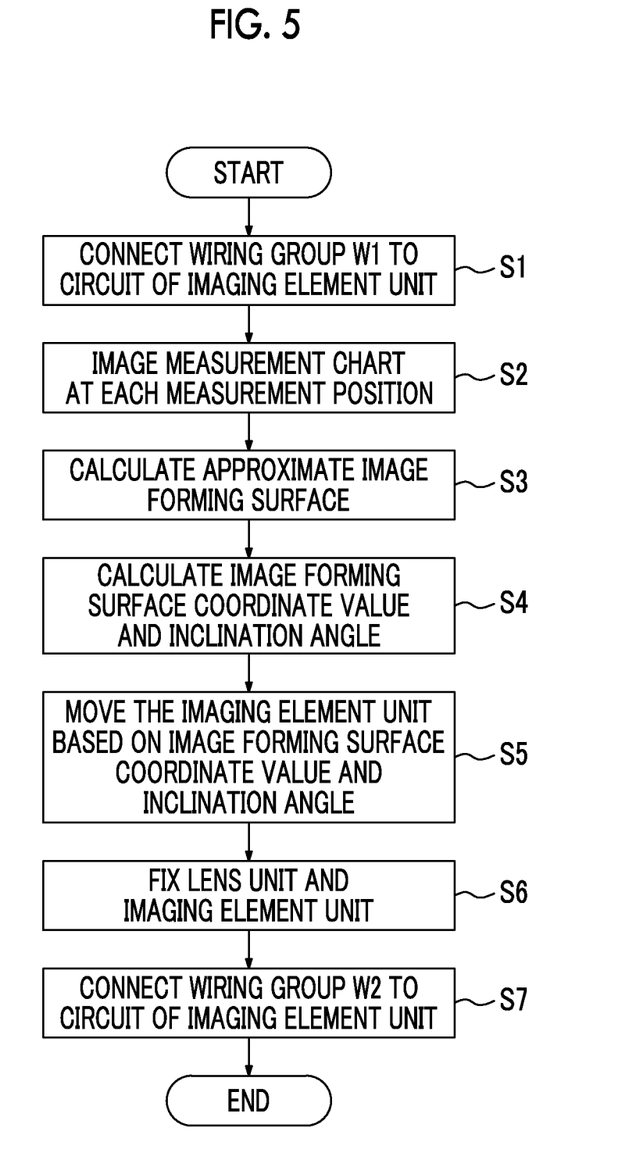
FIG. 5 is a flowchart of a manufacturing process of the imaging module.

FIG. 5 shows a flow of a manufacturing process of the imaging module 1.

First, the second connection portion 42 which is provided in the lead-out region A2 of the flexible substrate 12 is connected to the connection portion 27 of the imaging element unit 3, and the wiring group W1 included in the lead-out region A2 is connected to the circuit of the imaging element unit 3 (Step S1).

Sequentially, the imaging element unit 3 moves to the plurality of measurement positions which are discretely set with respect to the position on the Z axis of the imaging element unit 3, the measurement chart 50 is imaged at each measurement position, and a plurality of images are obtained (Step S2).

Sequentially, an approximate image forming surface of the lens group 10 of the lens unit 2 is calculated from the plurality of obtained images (Step S3). The approximate image forming surface can be calculated using a method disclosed in JP2010-21985A, and a focusing degree at each measurement position is estimated for each pixel region in which each image of the chart images CH1, CH2, CH3, CH4, and CH5 of the measurement chart 50 is formed on the image receiving surface of the imaging element 20 of the imaging element unit 3. For example, the focusing degree can be estimated using a Contrast Transfer Function (CTF), and it is considered that the focusing degree increases as the CTF value of the image region corresponding to each pixel region increases. In addition, for each pixel region, a coordinate value on the Z axis in which the focusing degree is the maximum value is calculated as a focusing coordinate value, based on a plurality of focusing degrees obtained from the plurality of images. In addition, an approximate plane is calculated from a point group on an XYZ coordinate system which is expressed by combining an XY coordinate value of each pixel region when the image receiving surface of the imaging element 20 is projected on an XY coordinate plane, and the focusing coordinate value (coordinate value on the Z axis) of the pixel region, and the approximate plane is set to the approximate image forming surface.

Sequentially, an image forming surface coordinate value F which is an intersection point between the approximate image forming surface and the Z axis is calculated, and an inclination angle OX around the X axis and an inclination angle OY around the Y axis of the approximate image forming surface with respect to the XY coordinate plane are calculated (Step S4). That is, the adjustment amount of the relative position between the lens unit and the imaging element unit on the Z axis, and the adjustment amount of the relative posture between the lens unit and the imaging element unit around the X axis and the Y axis orthogonal to the Z axis are calculated. Based on the calculated image forming surface coordinate value F and inclination angles θX and θY, the imaging element unit 3 moves in the Z axis direction and rotates around the X axis and the Y axis, and the image receiving surface of the imaging element 20 coincides with the approximate image forming surface (Step S5).

The lens unit 2 and the imaging element unit 3, in which the relative position has been adjusted, are fixed to each other (Step S6), the first connection portion 41 provided in the accommodation region A1 of the flexible substrate 12 is connected to the connection portion 26 of the imaging element unit 3, and the wiring group W2 which is rigidly wired by the accommodation region A1 is connected to the circuit of the imaging element unit 3 (Step S7).

In addition, in the present example, the plurality of images are obtained by moving the imaging element unit 3. However, the plurality of image may be obtained by setting the plurality of measurement positions with respect to the measurement chart 50 or the position on the Z axis of the lens unit 2 and moving the measurement chart 50 or the lens unit 2 to each measurement position.

In the above-described processes, when the plurality of images for calculating the approximate image forming surface are obtained, the signals for operating the Ay direction actuator 30y and the position sensor 31y of the lens unit 2 are input to the external connection portion 21 of the imaging element unit 3 via the connector cable 52 to operate the Ay direction actuator 30y and the position sensor 31y. That is, in the state where the actuator 30y and the position sensor 31y are operated via the external connection portion, the plurality of images for calculating the approximate image forming surface are obtained.

The signals for operating the Ay direction actuator 30y and the position sensor 31y includes a control signal for instructing the position of the lens barrel 13 in the Ay axial direction to the control IC 34 of the imaging element unit 3, and driving power of the control IC 34 of the imaging element unit 3. The control IC 34 calculates the movement amount in the Ay axial direction of the lens barrel 13 based on the control signal input to the external connection portion 21 and the position signal output from the position sensor 31y, and controls the actuator 30x based on the calculated movement amount.

The driving power of the actuator 30y and the position sensor 31y output from the control IC 34, and the position signal output from the position sensor 31y are transmitted by the wiring group W1 which is included in the lead-out region A2 of the flexible substrate 12.

As described above, the lens barrel 13 is held at a predetermined position in each axial direction of the Ax axial direction, the Ay axial direction, and the Az axial direction by the biasing member 35. However, the lens barrel 13 is likely to be vertically deviated downward due to the influence of gravity. In the shown example in which the lens unit 2 is disposed in the state where the Ay axial direction is vertical, the lens barrel 13 is likely to be deviated from a predetermined position in the Ay axial direction. Meanwhile, the Ax axial direction and the Az axial direction orthogonal to the Ay axial direction are horizontal, and the lens barrel 13 is held at a predetermined position in the Ax axial direction and the Az axial direction.

Therefore, the lens barrel 13 is disposed at a predetermined position by operating the Ay direction actuator 30y and the position sensor 31y, and in this state, the plurality of images for calculating the approximate image forming surface are obtained. Accordingly, it is possible to appropriately estimate the focusing degree for each pixel region on the image receiving surface of the imaging element 20. Therefore, it is possible to calculate the approximate image forming surface with high accuracy, and it is possible to increase accuracy of the adjustment with respect to the relative positional posture between the lens unit 2 and the imaging element unit 3.

In addition, unlike a case where all wires are flexibly wired by the lead-out region A2, only the wiring group W1, which is a portion which includes the wiring group connected to the actuator operated when the relative positional posture between the lens unit 2 and the imaging element unit 3 is adjusted, is flexibly wired by the lead-out region A2 of the flexible substrate 12, and it is possible to decrease a width of the lead-out region A2. When the imaging element unit 3 rotates around the X axis and the Y axis and the image receiving surface of the imaging element 20 coincides with the approximate image forming surface, a reaction force generated from torsion or bending due to stiffness of the flexible substrate 12 acts on the lens unit 2 and the imaging element unit 3. However, by decreasing the width of the lead-out region A2, it is possible to decrease the stiffness of the flexible substrate 12 in the lead-out region A2. Accordingly, it is possible to decrease the reaction force of the flexible substrate 12. Typically, when the image receiving surface of the imaging element 20 coincides with the approximate image forming surface, the rotations around the X axis and the Y axis of the imaging element unit 3 are slight rotations such as a range within ±0.05°. Accordingly, by decreasing the reaction force of the flexible substrate 12, it is possible to increase the accuracy of the adjustment with respect to the relative positional posture between the lens unit 2 and the imaging element unit 3, and it is possible to decrease time required for the adjustment.

Moreover, in the present imaging module 1, the wiring group connected to the Ay direction actuator 30y and the position sensor 31y is flexibly wired by the lead-out region A2 of the flexible substrate 12. However, from the viewpoint of decreasing the reaction force of the flexible substrate 12, the wiring group connected to the position sensor 31y may be routed to the first connection portion 41 of the accommodation region A1 of the flexible substrate 12, and only the wiring group connected to the Ay direction actuator 30y may be flexibly wired by the lead-out region A2 of the flexible substrate 12. Accordingly, the width of the lead-out region A2 decreases and it is possible to further decrease the reaction force of the flexible substrate 12. In this case, the position control of the lens barrel 13 is an open loop control. Meanwhile, the wiring group connected to the Ay direction actuator 30y and the position sensor 31y are flexibly wired by the lead-out region A2 of the flexible substrate 12, the position sensor 31y is also operated, the closed loop control is performed on the position of the lens barrel 13, and it is possible to dispose the lens barrel 13 at a predetermined position with high accuracy.

The decrease in the reaction force of the flexible substrate 12 is effective when a pixel pitch of the imaging element 20 of the imaging element unit 3 decreases, and is particularly effective when the pixel pitch is 1 μm or less. If the pixel pitch decreases, that is, if the pixel size decreases, an allowable circle of confusion decreases, and incident light per one pixel decreases. Accordingly, a fast lens in which an opening F-Number is small is used. In addition, since a focal depth of range decreases if the F-Number decreases, strict adjustment of the relative positional posture between the lens unit 2 and the imaging element unit 3 is required, and strict adjustment is particularly required if the pixel pitch is 1 μm or less.

Moreover, as described above, the Ay axial direction is vertical. However, the Ax axial direction or the Az axial direction may be vertical. When the Ax axial direction is vertical, the wiring group connected to the Ax direction actuator 30x which moves the lens barrel 13 in the Ax axial direction may be flexibly wired by the lead-out region A2 of the flexible substrate 12. In addition, when the Az axial direction is vertical, the wiring group connected to the Az direction actuator 30z which moves the lens barrel 13 in the Az axial direction may be flexibly wired by the lead-out region A2 of the flexible substrate 12.

In addition, in the present imaging module 1, since the Ax axial direction, the Ay axial direction, and the Az axial direction are orthogonal to each other, two axial directions are horizontal, one axial direction is vertical, and the wiring group connected to one actuator which moves the lens barrel 13 in the axial direction which is vertical may be flexibly wired by the lead-out region A2 of the flexible substrate 12. Meanwhile, when only one axial direction is horizontal, the wiring group connected to two actuators which move the lens barrel 13 in two other axial directions is flexibly wired by the lead-out region A2 of the flexible substrate 12. From the viewpoint of a decrease in the reaction force of the flexible substrate 12, preferably, the Ax axial direction, the Ay axial direction, and the Az axial direction are orthogonal to one another, one axial direction is vertical, and the wiring group connected to two actuators corresponding to two axis directions which are horizontal may be routed to the first connection portion 41 of the accommodation region A1. Accordingly, the width of the lead-out region A2 decreases, and it is possible to further decrease the reaction force of the flexible substrate 12.

Figure 6:
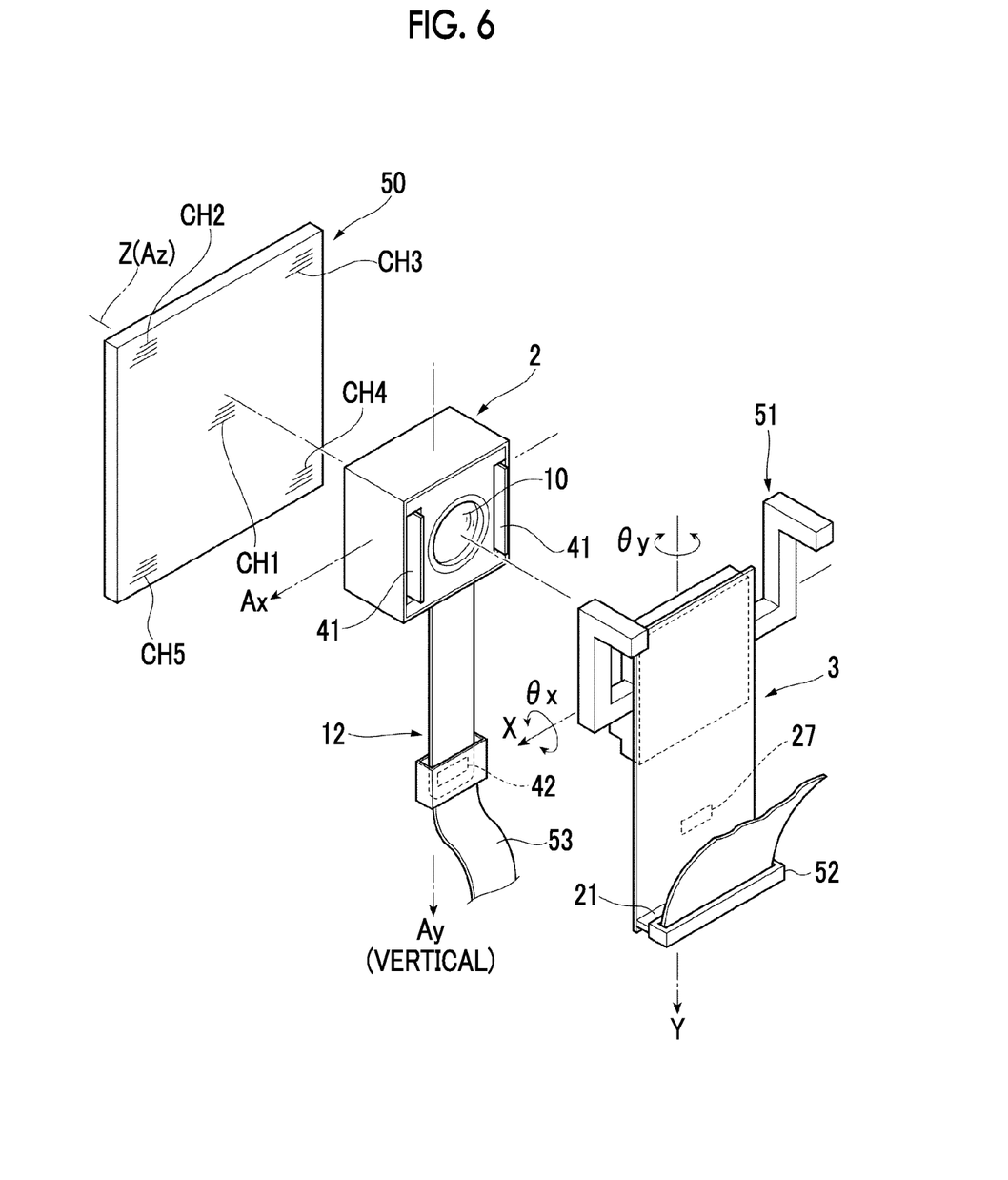
FIG. 6 is a schematic view of another example of the manufacturing method of the imaging module of FIG. 1.

FIG. 6 schematically shows another example of the manufacturing method of the imaging module 1.

In the example shown in FIG. 6, a connector cable 53 is connected to the second connection portion 42 which is provided in the lead-out region A2 of the flexible substrate 12, and the signals for operating the Ay direction actuator 30y and the position sensor 31y are directly input to the lens unit 2 via the connector cable 53.

As a method which directly inputs the signals for operating the Ay direction actuator 30y and the position sensor 31y to the lens unit 2, for example, it is considered that a terminal group is provided on the side surface of the housing 14 of the lens unit 2, a probe comes into contact with the terminal group, and signals are input to the lens unit 2. However, there is a concern that deformation or positional deviation of the lens unit 2 may occur due to the contact of the probe. Meanwhile, in the present embodiment, since the lead-out region A2 of the flexible substrate 12 is interposed therebetween, it is possible to suppress deformation or positional deviation of the lens unit 2. In addition, in the imaging module 1, since the width of the lead-out region A2 can be decreased, it is possible to decrease the stiffness of the flexible substrate 12 in the lead-out region A2, and it is possible to prevent an external force from being transmitted via the lead-out region A2.

Next, another example of the imaging module will be described.

Figure 7:
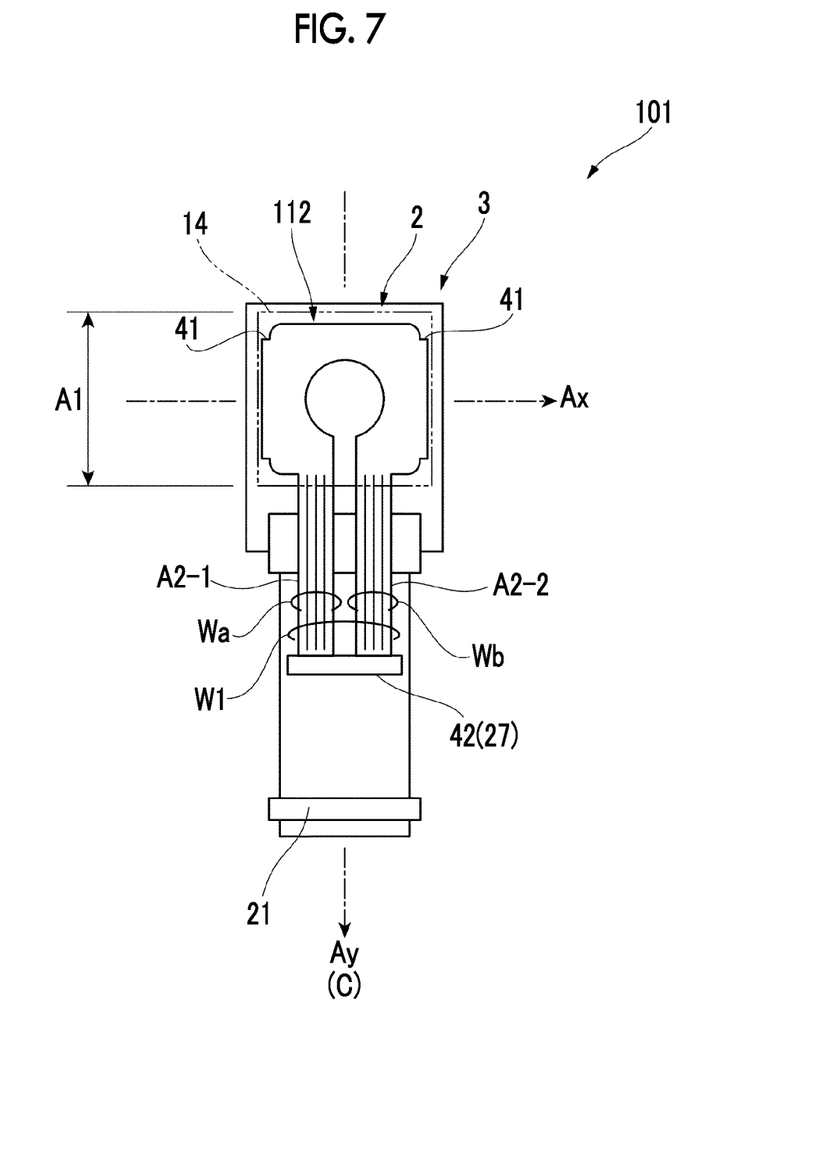
FIG. 7 is a schematic view of another example of the imaging module for explaining the embodiment of the present invention.

In an imaging module 101 shown in FIG. 7, a flexible substrate 112, which is configured so as to include the plurality of wires extending between the lens unit 2 and the imaging element unit 3, includes the accommodation region A1 which is accommodated in the housing 14 of the lens unit 2, and lead-out regions A2-1 and A2-2 which are led out from the housing 14.

The wiring group W1, which is a portion including the wiring group connected to the actuator which is operated when the relative positional posture between the lens unit 2 and the imaging element unit 3 is adjusted, is divided into a plurality of wiring sets Wa and Wb, one wiring set Wa is flexibly wired by the lead-out region A2-1 and the other wiring set Wb is flexibly wired by the lead-out region A2-2 so as to be separated from each other.

A method which divides the wiring group W1 into the plurality of wiring sets may be arbitrarily selected. For example, the Ay direction actuator 30y and the position sensor 31y are operated when the relative positional posture between the lens unit 2 and the imaging element unit 3 is adjusted, and the wiring group connected to the Ay direction actuator 30y and the position sensor 31y is included in the wiring group W1. Accordingly, the wiring group which transmits the driving power of the Ay direction actuator 30y and the position sensor 31y may be set to one set, and the wiring group which transmits the position signals of the position sensor 31y may be set to one set. That is, in a state where the actuator 30y is operated through the wiring group, the plurality of images for calculating the approximate image forming surface are obtained. Moreover, the wiring group which transmits the driving power of the actuator 30y may be set to one set, and the wiring group which transmits the driving power and the position signals of the position sensor 31y may be set to one set. In addition, the Ax direction actuator 30x, the position sensor 31x, the Ay direction actuator 30y, and the position sensor 31y are operated when the relative positional posture between the lens unit 2 and the imaging element unit 3 is adjusted, the wiring group which is connected to the Ax direction actuator 30x, the position sensor 31x, the Ay direction actuator 30y, and the position sensor 31y is included in the wiring group W1. Accordingly, the wiring group which is connected to the Ax direction actuator 30x and the position sensor 31x may be set to one set, and the wiring group which is connected to the Ay direction actuator 30y and the position sensor 31y may be set to one set. In addition, the wiring group may be divided into three wiring sets or more, and in this case, the lead-out regions having a number corresponding to the number of the sets may be provided on the flexible substrate 12.

In the imaging-module manufacturing method shown in FIGS. 4 and 5, when the imaging element unit 3 rotates around the X axis and the Y axis and the image receiving surface of the imaging element 20 coincides with the approximate image forming surface, the reaction force generated from torsion or bending due to the stiffness of the flexible substrate 12 acts on the lens unit 2 and the imaging element unit 3. However, by appropriately dividing the wiring group W1, which is a portion including the wiring group connected to the actuator which is operated when the relative positional posture between the lens unit 2 and the imaging element unit 3 is adjusted, into the lead-out regions A2-1 and A2-2, it is possible to decrease the width of each of the lead-out regions A2-1 and A2-2, it is possible to decrease the stiffness of the lead-out regions A2-1 and A2-2, and it is possible to further decrease the reaction force of the flexible substrate 112.

Moreover, in the present imaging module 101, the lead-out regions A2-1 and A2-2 extend in the Ay axial direction so as to be parallel to each other. Accordingly, the wiring sets Wa and Wb which are disposed on the lead-out regions A2-1 and A2-2 extend in the Ay axial direction so as to be parallel to each other. In addition, the lead-out region A2-1 is provided on one of two regions which are divided in the Ax axial direction by a center surface C which includes the optical axis Az of the lens and the Ay axis along a plane. In addition, the lead-out region A2-2 is provided on the other of the two regions which are divided in the Ax axial direction by the center surface C. Accordingly, the wiring sets are provided on both sides in a state where the center surface C is interposed between both sides. More specifically, the wiring sets Wa and Wb are symmetrically provided in the state where the center surface C is interposed therebetween. In the imaging-module manufacturing method shown in FIGS. 4 and 5, by disposing one rotation axis (X axis or Y axis) of the imaging element unit 3 in a plane of the center surface C, the reaction force generated due to torsion or bending of the lead-out regions A2-1 and A2-2 acts on the lens unit 2 and the imaging element unit 3 so as to be approximately uniformly distributed in a state where the rotation axis disposed in the plane of the center surface C is interposed therebetween. Accordingly, the relative positional posture between the lens unit 2 and the imaging element unit 3 is easily adjusted. From the viewpoint of approximately uniformly distributing the reaction force, preferably, the lead-out regions A2-1 and A2-2 are symmetrically provided in the state where the center surface C is interposed therebetween.

In addition, in the present imaging module 101, the lead-out regions A2-1 and A2-2 are led out from one side surface of the housing 14 directed in the Ay axial direction facing the external connection portion 21 of the imaging element unit 3, and are led out in the same direction as each other. In this way, if the lead-out regions A2-1 and A2-2 are led out in the same direction as each other from the housing 14, unlike when the lead-out regions A2-1 and A2-2 are led out in the directions different from each other or are lead out in the direction different from the direction facing the external connection portion 21, it is possible to decrease a size of the imaging module.

Figure 8:
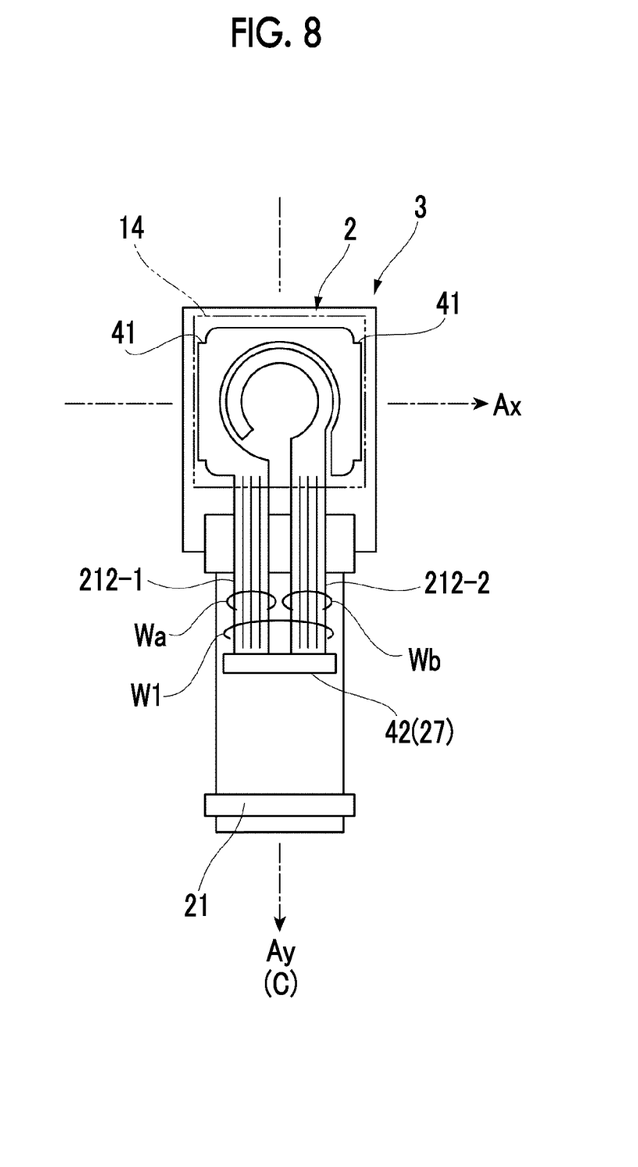
FIG. 8 is a schematic view of still another example of the imaging module for explaining the embodiment of the present invention.

Moreover, as shown in FIG. 8, the wiring sets Wa and Wb may be flexibly wired so as to be separated from each other using flexible substrates 212-1 and 212-2 different from each other for each of the wiring sets Wa and Wb.

The above-described imaging module is supported by a support member such as a substrate (not shown), is disposed in a housing of an electronic device such as a digital camera or an on-vehicle camera, and is provided as an imaging device. In addition to the above-described electronic device, for example, as an object into which the imaging module is incorporated, for example, there are a camera built-in Personal Computer (PC), an external type camera for a PC, an interphone with a camera, or electronic devices such as a portable terminal device having a imaging function, a wrist watch type terminal device, and a spectacle type terminal device. For example, as the portable terminal device, there is a portable phone, a smart phone, a Personal Digital Assistants (PDA), a portable game console, or the like.

The present invention is not limited to the above-described embodiments, and modifications or applications which are performed by a person skilled in the art based on the combinations of configurations of the embodiments, descriptions of the present specification, and well-known technologies are included in the present invention and are included within scopes for which protection is sought.

As described above, the following matters are disclosed in the present specification.

(1) An imaging module, includes: an imaging element unit which includes a circuit in which an imaging element and an external connection portion are provided; a lens unit which includes a lens group, a first image-blur correction driving unit which moves at least a portion of lenses of the lens group with respect to the imaging element in a first direction in a plane intersecting an optical axis of the lens group, a second image-blur correction driving unit which moves at least a portion of the lenses with respect to the imaging element in a second direction intersecting the first direction, a focus driving unit which moves at least a portion of the lenses of the lens group with respect to the imaging element in a direction of the optical axis of the lens group, and a connection portion, and which is fixed to the imaging element unit; and a flexible wiring portion which includes a wiring group which connects the circuit to at least one driving unit among the first image-blur correction driving unit, the second image-blur correction driving unit, and the focus driving unit via the connection portion, and which extends between the imaging element unit and the lens unit, in which the circuit is electrically connected to the flexible wiring portion using a conductive joining material by which the circuit and the flexible wiring portion are joined to each other.

(2) In the imaging module described in (1), the lens unit includes a sensor which detects a position of the lens which is moved by the first image-blur correction driving unit, the second image-blur correction driving unit, and the focus driving unit, and the connection portion is electrically connected to the sensor.

(3) In the imaging module described in (1) or (2), the first direction, the second direction, and the direction of the optical axis are orthogonal to one another, and the connection portion is electrically connected to at least one driving unit among the first image-blur correction driving unit, the second image-blur correction driving unit, and the focus driving unit.

(4) In the imaging module described in (3), the first direction and the second direction are orthogonal to each other, and the connection portion is electrically connected to two driving units among the first image-blur correction driving unit, the second image-blur correction driving unit, and the focus driving unit.

(5) In the imaging module described in any one of (1) to (4), the wiring group included in the flexible wiring portion is divided into a plurality of wiring sets, and each of the wiring sets is wired so that the plurality of wiring sets are separated from each other.

(6) In the imaging module described in (5), the wiring sets extend to be parallel to each other, and are provided on both sides in a state where a center surface, which includes the optical axis of the lens group along a plane and is parallel to an extension direction of the wiring set, is interposed between both sides.

(7) In the imaging module described in (5) or (6), the wiring sets extend to be parallel to each other, and are symmetrically provided in the state where the center surface, which includes the optical axis of the lens group along a plane and is parallel to the extension direction of the wiring set, is interposed between the wiring sets.

(8) In the imaging module described in any one of (1) to (7), the lens unit includes a housing which accommodates the driving unit, and the wire group included in the flexible wiring portion is led out from the housing toward the external connection portion.

(9) In the imaging module described in any one of (1) to (8), a pixel pitch of the imaging element is 1 µm or less.

(10) An electronic device on which the imaging module described in any one of (1) to (9) is mounted.

(11) In a manufacturing method of the imaging-module described in any one of (1) to (9), the method includes: moving any one of the lens unit and the imaging element unit set on a Z axis orthogonal to a measurement chart, and the measurement chart to a plurality of measurement positions; imaging a measurement chart image, which is imaged by the lens unit, using the imaging element, in each of the measurement positions in a state where the driving unit which is connected to the circuit by the wiring group included in the flexible wiring portion is operated by the external connection portion; calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and adjusting a relative position posture between the lens unit and the imaging element unit based the calculated adjustment amounts, fixing the lens unit and the imaging element unit to each other, and connecting the connection portion of the imaging element unit to the circuit.

(12) In a manufacturing method of the imaging-module described in any one of (1) to (9), the method includes: moving any one of the lens unit and the imaging element unit set on a Z axis orthogonal to a measurement chart, and the measurement chart to a plurality of measurement positions; imaging a measurement chart image, which is imaged by the lens unit, using the imaging element, in each of the measurement positions in a state where the driving unit to which the wiring group included in the flexible wiring portion is connected is operated by the wire group; calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and adjusting a relative position posture between the lens unit and the imaging element unit based on the calculated adjustment amounts, fixing the lens unit and the imaging element unit to each other, and connecting the flexible wiring portion and the connection portion of the imaging element unit to the circuit.

(13) In the imaging-module manufacturing method described in (11) or (12), the method further includes setting the lens unit, the imaging element, and the measurement chart in a state where a movement direction of the lens which is moved by any one of the driving units, to which the wiring group included in the flexible wiring portion is connected, is a vertical direction.

(14) In the imaging-module manufacturing method described in any one of (11) to (13), the wire group included in the flexible wiring portion is divided into a plurality of wiring sets, and each of the wiring sets is wired so that the plurality of wiring sets are separated from each other, the wiring sets extend to be parallel to each other, and are provided on both sides in a state where a center surface, which includes the optical axis of the lens group along a plane and is parallel to an extension direction of the wiring set, is interposed between both sides, and any one of an X axis direction and a Y axis direction is an in-plane direction of the center surface.

(15) In the imaging-module manufacturing method described in any one of (11) to (13), the wiring group included in the flexible wiring portion is divided into a plurality of wiring sets, and each of the wiring sets is wired so that the plurality of wiring sets are separated from each other, the wiring sets extend to be parallel to each other, and are symmetrically provided in the state where the center surface, which includes the optical axis of the lens group along a plane and is parallel to the extension direction of the wiring set, is interposed between the wiring sets, and any one of an X axis direction and a Y axis direction is an in-plane direction of the center surface.

EXPLANATION OF REFERENCES

1: imaging module
2: lens unit
3: imaging element unit
10: lens group
11: lens drive unit
12: flexible substrate
14: housing
20: imaging element
21: external connection portion
22: element fixing substrate
30$x$: Ax direction actuator (first image-blur correction driving unit)
30$y$: Ay direction actuator (second image-blur correction driving unit)
30$z$: Az direction actuator (focus driving unit)
31$x$, 31$y$, and 31$z$: position sensor
32$x$ and 32$y$: angular speed sensor (circuit)
34: control IC (circuit)
50: measurement chart
51: holding member
52: connector cable
W1: flexibly wired wiring group
W2: rigidly wired wiring group
Wa and Wb: wiring set
C: center surface

What is claimed is:

1. An imaging module, comprising:
an imaging element unit which has a circuit in which an imaging element and an external connection portion are provided;
a lens unit which has a lens group, a first image-blur correction driving unit which moves at least a portion of lenses of the lens group with respect to the imaging element in a first direction in a plane intersecting an optical axis of the lens group, a second image-blur correction driving unit which moves at least a portion of the lenses with respect to the imaging element in a second direction intersecting the first direction, and a focus driving unit which moves at least a portion of the lenses of the lens group with respect to the imaging element in a direction of the optical axis of the lens group, and which is fixed to the imaging element unit; and
a flexible wiring portion which has an accommodation region accommodated in the lens unit, and a lead-out region led outside the lens unit, and extends between the imaging element unit and the lens unit,
wherein the flexible wiring portion includes a first wiring group which is electrically connected to at least one driving unit of the first image-blur correction driving unit, the second image-blur correction driving unit, or the focus driving unit, and is led from the accommodation region to the lead-out region, and a second wiring group which is electrically connected to a driving unit except for the driving unit which is electrically connected to the first wiring group among the first image-blur correction driving unit, the second image-blur correction driving unit, and the focus driving unit, and wherein the circuit is electrically connected to the second wiring group via a first connection portion of the flexible wiring portion in the accommodation region and is electrically connected to the first wiring group via a second connection portion of the flexible wiring portion in the lead-out region, using a conductive joining material by which the circuit and the flexible wiring portion are joined to each other.

2. The imaging module according to claim 1,
wherein the lens unit has a sensor which detects a position of the lens which is moved by the first image-blur correction driving unit, the second image-blur correction driving unit, and the focus driving unit, and the first wiring group or the second wiring group is electrically connected to the sensor.

3. The imaging module according to claim 1,
wherein the first direction, the second direction, and the direction of the optical axis are orthogonal to one another.

4. The imaging module according to claim 2,
wherein the first direction, the second direction, and the direction of the optical axis are orthogonal to one another.

5. The imaging module according to claim 3,
wherein the first direction and the second direction are orthogonal to each other, and
wherein the first wiring group is electrically connected to two driving units among the first image-blur correction driving unit, the second image-blur correction driving unit, and the focus driving unit.

6. The imaging module according to claim 1,
wherein the first wiring group included in the flexible wiring portion is divided into a plurality of wiring sets, and each of the wiring sets is wired so that the plurality of wiring sets are separated from each other.

7. The imaging module according to claim 2,
wherein the first wiring group included in the flexible wiring portion is divided into a plurality of wiring sets, and each of the wiring sets is wired so that the plurality of wiring sets are separated from each other.

8. The imaging module according to claim 3,
wherein the first wiring group included in the flexible wiring portion is divided into a plurality of wiring sets, and each of the wiring sets is wired so that the plurality of wiring sets are separated from each other.

9. The imaging module according to claim 4,
wherein the first wiring group included in the flexible wiring portion is divided into a plurality of wiring sets, and each of the wiring sets is wired so that the plurality of wiring sets are separated from each other.

10. The imaging module according to claim 5,
wherein the first wiring group included in the flexible wiring portion is divided into a plurality of wiring sets, and each of the wiring sets is wired so that the plurality of wiring sets are separated from each other.

11. The imaging module according to claim 6,
wherein the wiring sets extend to be parallel to each other, and are provided on both sides in a state where a center surface, which includes the optical axis of the lens group along a plane and is parallel to an extension direction of the wiring set, is interposed between both sides.

12. The imaging module according to claim 6,
wherein the wiring sets extend to be parallel to each other, and are symmetrically provided in the state where the center surface, which includes the optical axis of the lens group along a plane and is parallel to the extension direction of the wiring set, is interposed between the wiring sets.

13. The imaging module according to claim 1,
wherein the lens unit includes a housing which accommodates the driving units, and
wherein the first wiring group included in the flexible wiring portion is led out from the housing toward the external connection portion.

14. The imaging module according to claim 1,
wherein a pixel pitch of the imaging element is 1 μm or less.

15. An electronic device on which the imaging module according to claim 1 is mounted.

16. A manufacturing method of the imaging-module according to claim 1, comprising:
moving any one of the lens unit and the imaging element unit set on a Z axis orthogonal to a measurement chart, and the measurement chart to a plurality of measurement positions;
imaging a measurement chart image, which is imaged by the lens unit, using the imaging element, in each of the measurement positions in a state where the driving unit which is connected to the circuit by the first wiring group included in the flexible wiring portion is operated through the external connection portion;
calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and
adjusting a relative positional posture between the lens unit and the imaging element unit based on the calculated adjustment amounts, fixing the lens unit and the imaging element unit, and connecting the first connection portion to the circuit.

17. The imaging-module manufacturing method according to claim 16, further comprising:
setting the lens unit, the imaging element, and the measurement chart in a state where a movement direction of the lens which is moved by any one of the driving units, to which the first wiring group included in the flexible wiring portion is connected, is a vertical direction.

18. The imaging-module manufacturing method according to claim 16,
wherein the first wiring group included in the flexible wiring portion is divided into a plurality of wiring sets, and each of the wiring sets is wired so that the plurality of wiring sets are separated from each other,
wherein the wiring sets extend to be parallel to each other, and are provided on both sides in a state where a center surface, which includes the optical axis of the lens group along a plane and is parallel to an extension direction of the wiring set, is interposed between both sides, and
wherein any one of an X axis direction and a Y axis direction is an in-plane direction of the center surface.

19. The imaging-module manufacturing method according to claim 16,
wherein the first wiring group included in the flexible wiring portion is divided into a plurality of wiring sets, and each of the wiring sets is wired so that the plurality of wiring sets are separated from each other, wherein the wiring sets extend to be parallel to each other, and are symmetrically provided in the state where the center surface, which includes the optical axis of the lens group along a plane and is parallel to the extension direction of the wiring set, is interposed between the wiring sets, and wherein any one of an X axis direction and a Y axis direction is an in-plane direction of the center surface.

20. A manufacturing method of the imaging-module according to claim 1, comprising:

moving any one of the lens unit and the imaging element unit set on a Z axis orthogonal to a measurement chart, and the measurement chart to a plurality of measurement positions;

imaging a measurement chart image, which is imaged by the lens unit, using the imaging element, in each of the measurement positions in a state where the driving unit to which the first wiring group included in the flexible wiring portion is connected is operated through the first wiring group;

calculating an adjustment amount of a relative position between the lens unit and the imaging element unit on the Z axis and an adjustment amount of a relative posture between the lens unit and the imaging element unit around an X axis and a Y axis orthogonal to the Z axis, based on the obtained plurality of images; and adjusting a relative position posture between the lens unit and the imaging element unit based on the calculated adjustment amounts, fixing the lens unit and the imaging element unit to each other, and connecting the first connection portion to the circuit.

* * * * *